United States Patent [19]

Edakubo et al.

[11] Patent Number: 4,499,504
[45] Date of Patent: Feb. 12, 1985

[54] VIDEO SYSTEM

[75] Inventors: Hiroo Edakubo, Tokyo; Masaya Maeda, Kanagawa, both of Japan

[73] Assignee: Canon Kabushiki Kaisha

[21] Appl. No.: 361,041

[22] Filed: Mar. 23, 1982

[30] Foreign Application Priority Data

Mar. 31, 1981 [JP] Japan .................... 56-45712

[51] Int. Cl.³ .............................................. H04N 5/76
[52] U.S. Cl. .................................... 358/335; 358/209; 358/229; 358/906
[58] Field of Search .............. 358/209, 213, 335, 906, 358/229

[56] References Cited

U.S. PATENT DOCUMENTS

4,232,329 11/1980 Horak et al. ...................... 360/22 X

Primary Examiner—Robert L. Richardson
Attorney, Agent, or Firm—Toren, McGeady and Stanger

[57] ABSTRACT

A video system including a video camera which has an image signal recording system for recording on a recording medium the image signal obtained from a photo-electric conversion means and a reproducing device which contains a driving mechanism for driving the medium in the video camera.

15 Claims, 8 Drawing Figures

VIDEO SYSTEM

BACKGROUND OF THE INVENTION

1. Field of the Invention

The present invention refers to a video system for recording and reproducing an image signal, particularly in systems having a video camera for picking up the object image.

2. Description of the Prior Art

For recording and reproducing an image signal, the video tape recorder (hereinafter called VTR) makes use of magnetic tape which was originally developed for broadcasting purposes. Quite recently, by inserting a long tape in the casette, the VTR has become used in the home. This home VTR is becoming more and more popular mainly for recording and reproducing television programs. In addition the VTR is increasingly being utilized with the video camera.

In conventional devices of the above type the video camera is completely separated from the VTR, and the image signal obtained from the video camera is recorded in the VTR via a connecting cable. Consequently, conventional devices have been confronted with the disadvantages that at the time of photographing it is necessary to carry both the camera and the VTR which is a burden, and the operability is inferior and convenient because the camera and the VTR have to be operated separately. Thus, a VTR with a built-in camera has been considered. However, there is a problem in the development of a compact image pick up tube and such a VTR has not yet been commercialized. Obstacles to a compact VTR with a built-in camera includes power consumption and space requirement for a reproducing mechanism such as for quick feeding and quick rewinding of the tape in the camera.

SUMMARY OF THE INVENTION

An object of the present invention is to provide a video system, in which the camera is only provided with the recording system and is connected to the reproducing device having the driving mechanism for reproduction, quick feeding and quick rewinding.

Another object of the present invention is to provide a video system, in which, when the camera is connected to the reproducing device, the driving system is also connected by opening of the external drive input clutch on the camera.

Another object of the present invention is to provide a video system in which the camera can be connected to the reproducing device by dismounting those elements which are provided at the side of the camera which are not necessary for reproduction, such as the grip.

It has now been found that these and other objects of the invention may be attained in a video system which includes a video comera having a photoelectric converting means for converting an object image into an electrical signal, a reproducing means for reproducing information on a recording medium, a driving mechanism for driving the recording medium, and a reproducing device which includes driving means connected to the driving mechanism so as to drive the mechanism.

Further objects of the present invention will be understood from the descriptions made below with reference to the drawings.

BRIEF DESCRIPTION OF THE DRAWINGS

FIGS. 1(a) and (b) show a perspective view of an embodiment of the camera with a built-in recording system.

DETAILED DESCRIPTION OF THE PREFERRED EMBODIMENT

Figure 1:
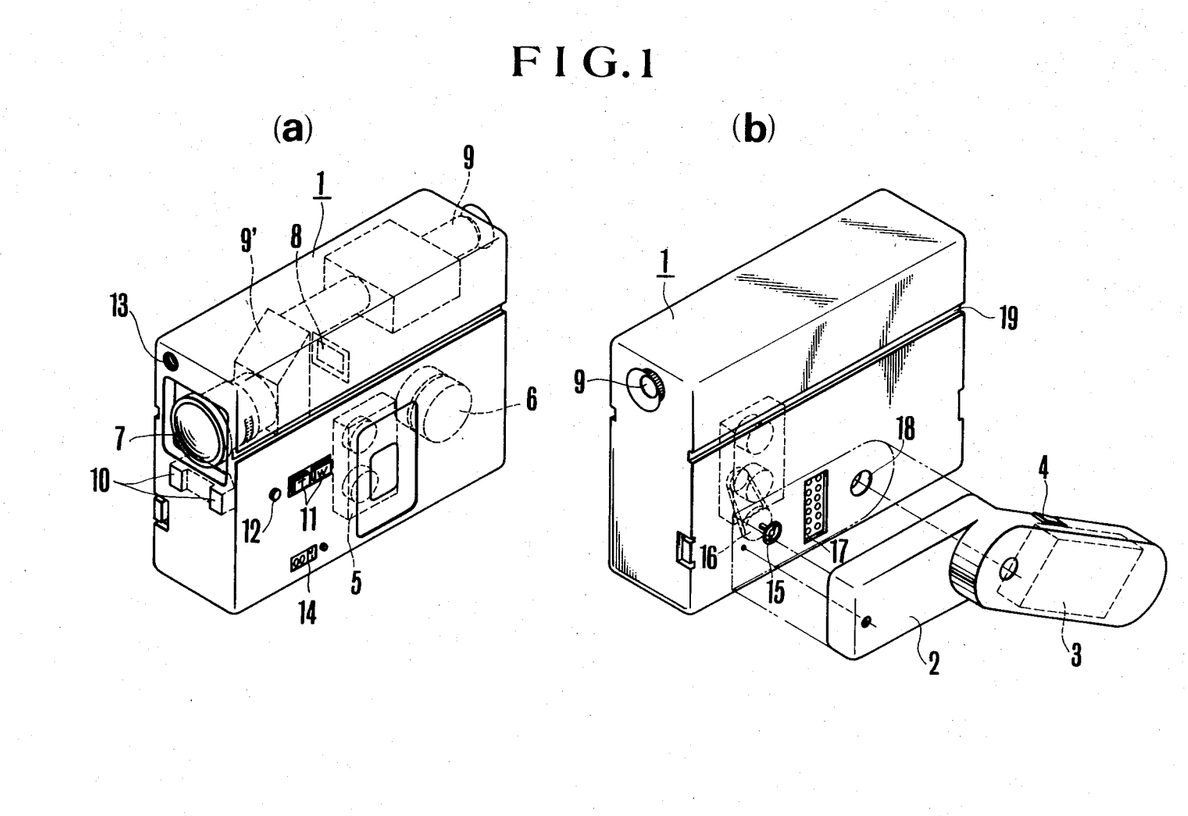

FIGS. 1(a) and (b) show an embodiment of the VTR in the recording system in accordance with the present invention. In the drawing, the camera body in which the recording system is disposed is identified by the reference numeral 1, the grip 2 is mounted on the camera during picture taking. The apparatus also includes a power source battery 3, a camera trigger button 4, a tape cassette 5 in which the magnetic tape is loaded. A rotary drum 6 contains the magnetic head (not shown) for recording the image signal on the tape and reproduces the image from the tape. The apparatus also includes a photographing lens 7, a solid image pick up element 8 for converting the optical image into an electrical signal, an optical finder 9, an auto focusing unit 10, an automatic zoom button 11, a focus lock button 12, a nondirectional microphone 13 for simultaneous sound pick up, a tape counter 14, an input clutch opening 15 for an external driving, a driving system 16 at the side of the camera, a connector 17 for the input and the output signal and the power source input, and positioning grooves 18 and 19.

Figure 2:
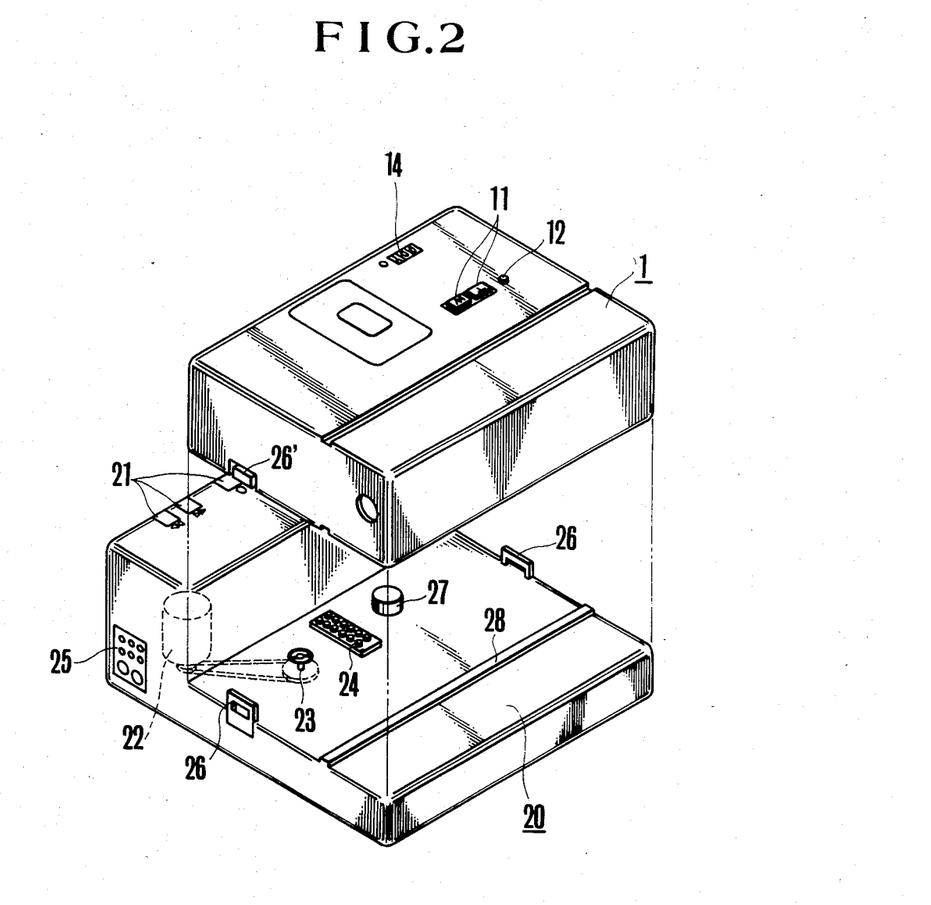
FIG. 2 is a perspective view of the camera and the reproducing device containing the reproducing system.

FIG. 2 shows the camera with the built in recording system and the reproducing device containing the reproducing system. There is shown the body of the reproducing device 20, buttons 21 for controlling various operations, motor 22 for external output driving, an external output clutch opening 23, a connector 24 for input, output and power source output, an input and output connector 25 for RF, sound, ANT, etc., the camera mounting hook 26 and the positioning projections 27 and 28.

In order to take a picture with the above camera the camera 1 is separated from the reproducing device 20 by disengaging the camera mounting hook 26 of the reproducing device 20 from the claw 26' at the side of the camera 1 as best seen in FIG. 2. Then the grip 2, containing the battery 3 and the trigger button 4, is secured on the camera with the positioning groove 18 and the screw as best seen in FIG. 1(b). When in this case the battery 3 is loaded in the grip 2, the space in the camera can be used effectively, while the external driving clutch 15 is covered with the grip 2 to cover the driving system for the tape. Furthermore, the battery 3 and the trigger switch in the grip 2 are connected to the camera 1 through the connector 17, whereby picture recording becomes possible by loading the magnetic tape cassette 5 in the camera 1. The trigger button 4 has two positions, whereby with the first position the power source is switched on, the tape is wound on the drum by means of a conventional means (not shown) and the drum 6 starts to run. However, the capstan (not shown) does not yet run so the tape is not fed. In the second position the capstan runs and the picture is recorded. At the same time the microphone 13 is switched on and the sound is also recorded. Thus, the power is economized with the two position trigger switch system.

The object image is formed on the solid image pick up element 8 such as CCD by means of the image pick up lens 7. The camera 1, containing the recording system, can be conveniently light and compact with the solid image pick up element. The solid image pick up element 8 carries out photoelectrical conversion, storage of photoelectrical charge and the transmission of the image signal output. The image signal is recorded on the tape via the recording system circuit and the video head in a conventional way. Furthermore, part of the incident light is reflected on the optical path of the photographing lens 7 by means of the half-transparent prism 9′ toward the view finder 9. In this system the image pick up lens 7 and the view finder 9 are assembled in a compact and cost efficient manner, whereby power is not necessary as in the electronic view finder.

Focusing at the time of image pick up is automatically carried out by means of the automatic focus unit 10, whereby the focus is fixed, as required, by means of the focus lock button 12. Furthermore, the zooming of the image pick up lens is carried out with a motor by means of the zoom button 11.

In order to reproduce the recorded image the grip 2 is taken away from the camera 1 containing the recording system. (FIG. 1(b)) The external driving input clutch 16 and the input and the output connector 17 for the power source and the image signal are exposed and can be connected to the reproducing device 20. Then, the camera 1 is secured on the reproducing device 20 by means of the mounting hook 26. (FIG. 2) At this time the camera 1 and the reproducing device 20 are correctly fixed in positional relation by means of the positioning grooves 18 and 19 at the side of the camera 1 and the positioning projections 27 and 28 at the side of the reproducing device 20. At the same time the clutch 15 at the side of the camera 1 and the external output clutch opening 23 at the side of the reproducing device 20 are connected to each other to connect the driving system. Furthermore, the connector 17 at the side of the camera 1 is connected to the positioning projections 27 and 28 at the side of the reproducing device 20 to connect the electrical system.

At the time of reproduction, by switching on the reproducing device 20 and depressing the play button in the group of buttons 21, a signal is transmitted to the side of the camera 1, the tape is loaded and the rotary head 6 runs and takes out the image signal. The image signal is transmitted to the side of the reproducing device 20, enters into the RF unit via the color reproducing circuit, the FM demodulator, etc., in a conventional way and is delivered as the VHF output from the connector 25 to reproduce the image. At the time of quick feeding or quick rewinding by depressing the FF button or the FR button in the group of operation buttons 21 the motor 22 at the side of the reproducing device 20 rotates and transmits the driving power to the side of the camera 1 via the clutches 23 and 15 and rotates the take up reel and the supply reel.

Figure 3:
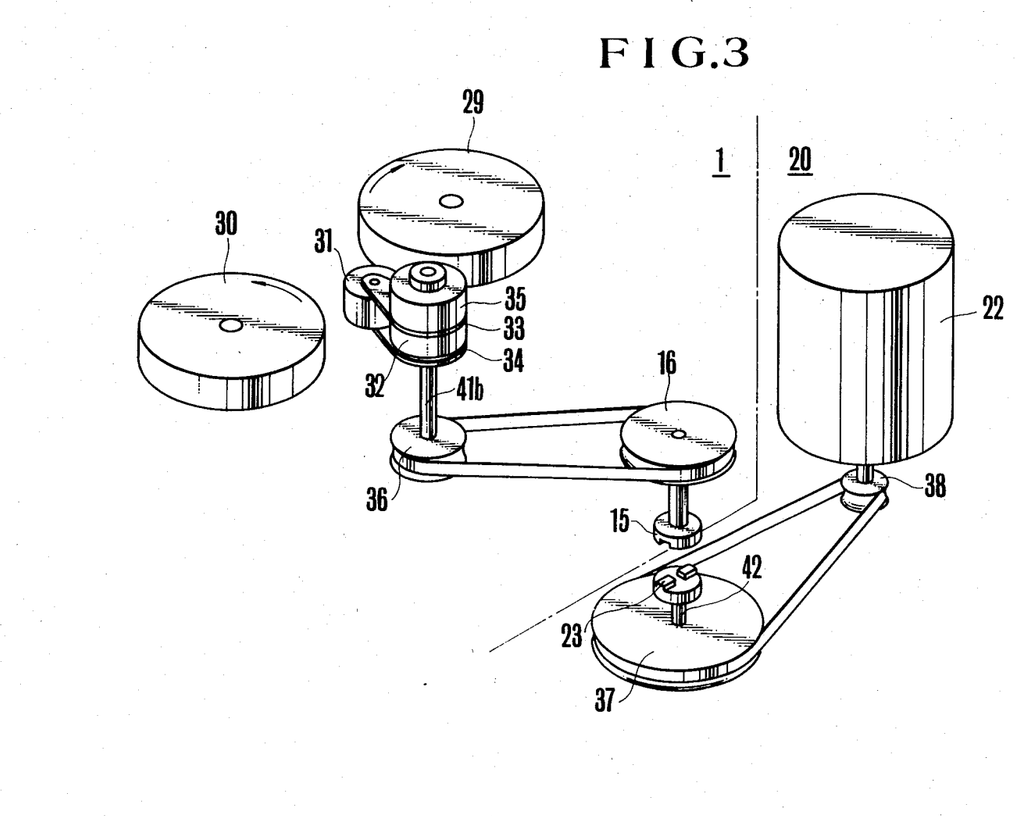
FIG. 3 is a perspective view of a quick feeding and quick rewinding mechanism in the camera and the reproducing device.
Figure 4:
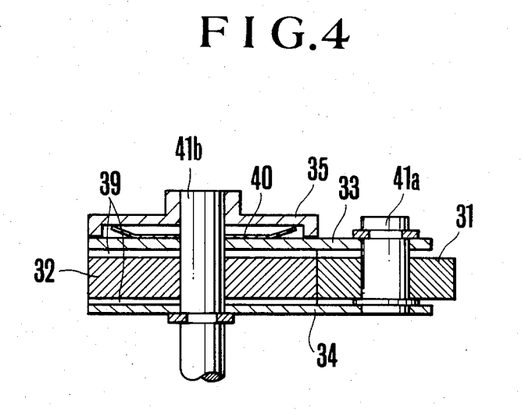
FIG. 4 is a sectional view of an important part of the quick feeding and the quick rewinding mechanism at the side of the camera in FIG. 3.

FIG. 3 shows the mechanism for quick feeding and quick rewinding, while FIG. 4 shows the mechanism at the side of the camera 1. There is shown a motor 22 for external driving at the side of the reproducing device 20, power transmitting pulleys 37 and 38, a clutch 23 at the side of the reproducing device, a clutch 15 at the side of the camera, pulleys 13, 36, a take up reel 29, a supply reel 30, idlers 31 and 32, an axis 41a, 41b, mounting or holder plates 33 and 34, a felt 39, a spring 40 and a cover 35.

During quick feeding rotation of the motor 22 at the side of the reproducing device 20 is transmitted to the side of the camera via the pulleys 38, 37 the clutches 23, 15 and further to the idlers 32, 31 via the pulleys 16, 36 at the side of the camera 1. The holder plates 33, 34 rotate around the axis 41b and are in the frictional contact with the idler 32 via the felt 39. The cover 35 is engaged with the axis 41b, whereby the holder plates 33, 34 are normally in frictional contact with the idler 32 by the strength of the spring 40. Consequently, the holder plates 33, 34 rotate around the axis 41b in the same direction as the idler 32. The idler 31 is mounted on the holder plates 33, 34 to contact the idler 32. The rotation transmitted to the idler 32 drives the holder plates 33, 34 toward the take up reel 29 in such a manner that the idler 31 is in contact with the take up reel 29. Thus, the rotation is transmitted to the take up reel 29. Because at this time the idler 32 always rotates in the direction in which the idler 31 is engaged in the take up reel 29, the take up reel 29 rotates in a stabilized way. Quick rewinding is carried out by rotating the motor 22 in the reversed direction with the idler 31 in contact with the supply reel 30 so as to transmit the rotation of the motor 22 to the supply reel, and quick rewinding is carried out in the same way as quick feeding. In such a construction, the mechanism of quick feeding and quick rewinding can be simplified in comparison to the conventional system, and contributes much to the realization of a compact camera.

Figure 5:
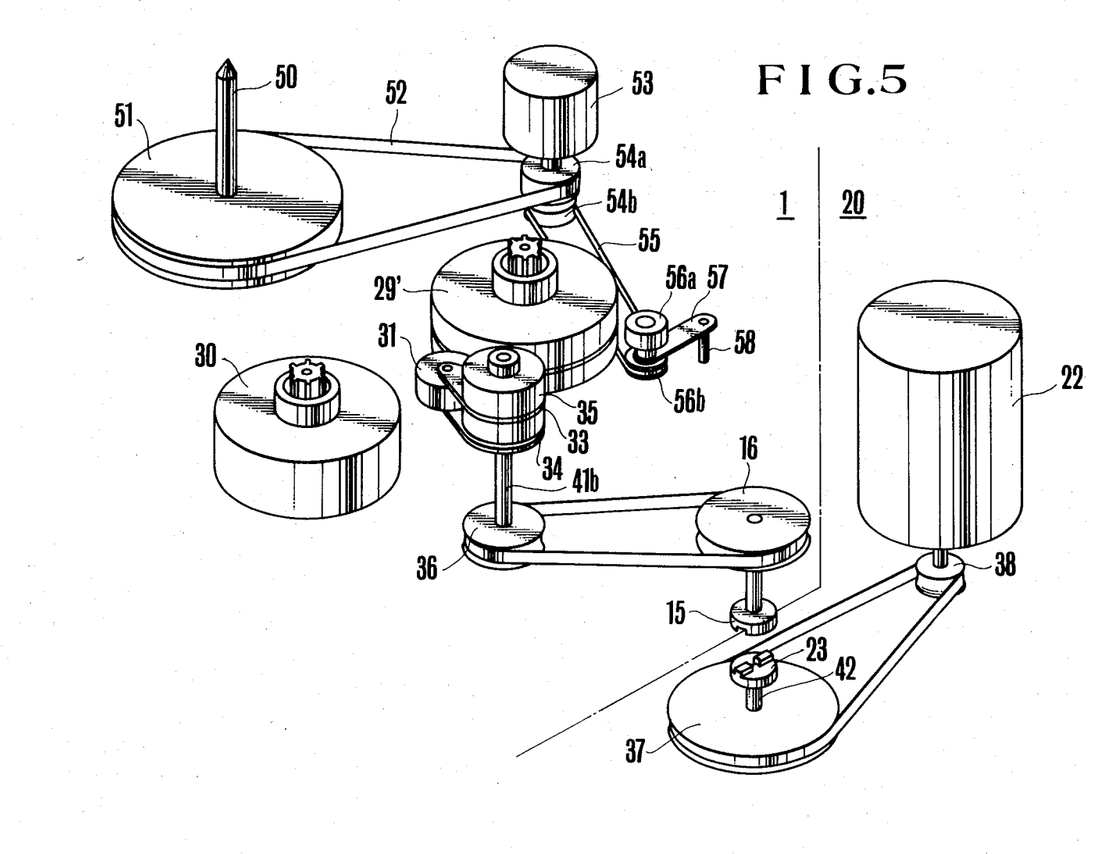
FIG. 5 is a sectional view of a second embodiment of the mechanism.

Reel driving at the time of image recording and normal reproduction will now be described with reference to FIGS. 4 and 5. Hereby, the similar members of FIG. 5 will be understood to have the same numerals as those in FIG. 3. In the drawing there is illustrated a capstan roller 50, a fly wheel 51, a belt 52, a capstan motor 53, pulleys 54a and 54b mounted on the motor 53, a belt 55, the take up idler 56a, the pulley 56b and an arm 58 on which the idler 56a and the pulley 56b, are rotatable around the axis 58.

Figure 6:
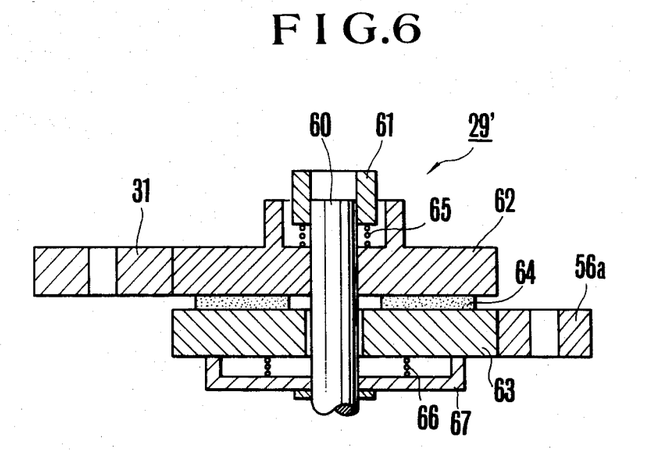
FIG. 6 is a sectional view of an important portion of the apparatus illustrated in FIG. 5.

At the time of image recording and normal reproduction, the capstan roller 50 is rotated with the capstan motor 53. Hereby, along with rotation of the arm 57 in the clockwise direction the take up idler 56a contacts the take up reel 29′ in such a manner that the take up reel 29′ is driven with the capstan motor 53. The take up reel 29′ is constructed as is shown in FIG. 6. In the drawing, the reel axis is identified by the numeral 60, the reel spindle 61 and, the upper reel 62 is pressed into the reel axis. The lower reel 63 is in rotatable contact with the reel axis 60. The apparatus includes a slip felt 64, springs 65 and 66 and a cover 67.

As is shown in the drawing, the upper reel 62 is in contact with the idler 31 at the time of quick feeding to transmit the frictional power with the idler to the reel axis 60 and rotate the reel 29′. The lower reel 63 is in contact with the take up idler 56a at the time of image recording and normal reproduction. Because of the frictional power of the idler 56a with the lower reel 63 the tape fed with the capstan roller 50 is wound with the slip effect of the felt.

Figure 7:
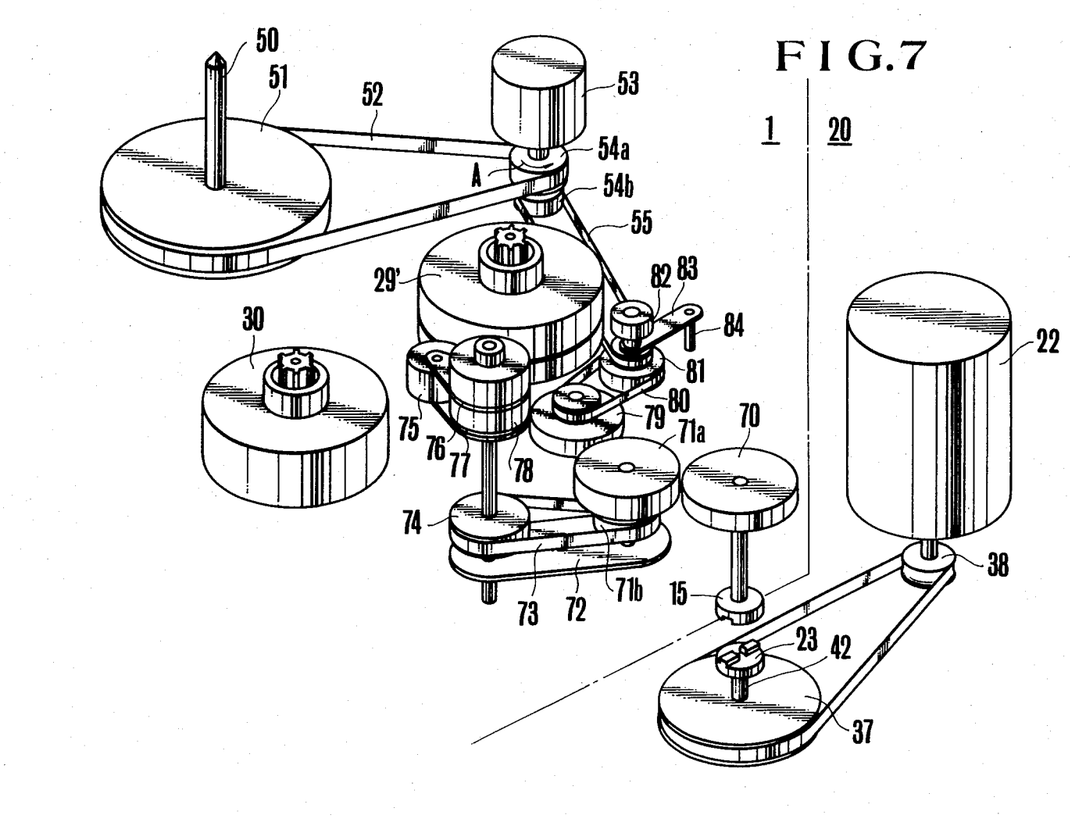
FIG. 7 is a perspective view of a third embodiment of the mechanism.

The third embodiment shown in FIG. 7 will be explained below. In the present embodiment quick feeding and quick rewinding can be carried out from the side of the video camera 1, while when the reproducing device 20 is mounted on the camera 1, quick feeding and quick rewinding of the motor can be carried out from the side of the reproducing device 20. The members in FIG. 7 corresponding to those in FIGS. 3 and 5 are identified by the same reference numerals.

In the drawing, the idler 70 is mounted coaxially with the clutch 15, the idler 71 is mounted on the axis on the holder plate 72, and the pulley 71b is secured coaxially with the pulley 71a. The apparatus also includes a belt 73, a pulley 74, an idler 75, holder plates 76 and 77, an idler 78, an idler 79, a belt 80, a pulley 81, a take up idler 82, an arm 83 holds the axis of the pulley 81 and the take up idler 82 and the axis 84 of the arm 83.

During image recording and normal reproduction, the arm 83 rotates around the axis 84 in the clockwise direction to bring the take up idler 82 in contact with the take up reel 29' and to rotate the take up reel 29'.

When the reproducing device is mounted, the idler 71a is in contact with the idler 79, whereby the rotation of the capstan motor 53 is transmitted to the idler 75 via the belt 55, the pulley 81, the belt 79, the idlers 79, 71a, the pulley 71b, the belt 73, the pulley 74 and the idler 75. When the capstan motor rotates in the direction of arrow A, the idler 75 is in contact with the take up reel 30 to carry out quick feeding. On the other hand, when the motor 53 rotates in the reversed direction to arrow A, the idler is in contact with the supply reel 30 to carry out quick rewinding.

Then when the camera 1 is mounted on the reproducing device 20, the clutch 24 is connected to the input clutch opening 15, while the arm 72 is rotated in the clockwise direction to bring the idler 71a in contact with the idler 70. Thus, as in the embodiment in FIG. 3, the driving power of the motor 22 at the side of the reproducing device 20 is transmitted to the take up reel 29' and the supply reel 30 to carry out quick feeding and quick rewinding.

Furthermore, as a variation of the above embodiment it is easily possible to provide the camera containing the recording system with the circuit of the image reproducing system. Furthermore, the clutch opening is opened and closed with accessories other than the grip such as a simple cap. Transmission of external power by means of the clutch can be used for high speed picture search as well as for quick feeding and quick rewinding.

In the video system in accordance with the present invention, any mechanism than the recording system, being connected with reproduction such as tape quick feeding and quick rewinding is separated from the camera as an independent reproducing device, while the input clutch for external driving is at the side of the camera to carry out quick feeding and quick rewinding. Consequently, the following advantages can be obtained, 1. Realization of a compact, light camera containing the recording system.
2. Decrease in camera power consumption.
3. Improved camera operability.

Hereby, the present invention is not limited to the above embodiment but can be applied and modified in various ways within the gist of the claims.

What is claimed is:

1. A device used solely for recording image pick-up video signals, comprising:
   image pick-up means to convert an object image into electrical signals;
   recording means to record on a long sized recording medium such video signals corresponding to said electrical signals;
   a transporting mechanism to transport said long sized recording medium;
   a main motor to produce a first driving power for transporting the recording medium at a first speed by the transporting mechanism;
   receiving means to mechanically receive a second driving power from an external auxiliary motor provided separately from said device to produce a second driving power for transporting the recording medium at a second speed which is faster than the first speed by the transporting mechanism; and
   a transmission mechanism to transmit the second driving power received by said receiving means to the transporting means.

2. A device according to claim 1, which further comprises an opening for receiving the second driving power with the receiving means.

3. A device according to claim 2, which further comprises a cover member to cover said opening.

4. A device according to claim 3, in which said cover member is a grip to hold the device solely used for recording.

5. A device according to claim 1, in which the long sized recording medium is a magnetic tape and the recording means is a magnetic field.

6. A video system comprising:
   (a) a device solely used for recording image pick-up video signals, including:
      image pick-up means to convert an object image into electrical signals;
      a magnetic head to record on a magnetic tape such video signals corresponding to said electrical signals and to reproduce the video signals recorded on the magnetic tape;
      a transporting mechanism to transport the magnetic tape;
      a main motor to produce a first driving power for transporting the magnetic tape at a first speed by the transporting mechanism;
      clutch means to mechanically receive external driving power for actuating the transporting mechanism with external driving power; and
   (b) an external driving power producing device, including:
      an auxiliary motor to produce a second driving power for transporting the magnetic tape at a speed faster than the first speed by the transporting mechanism; and
      a driving power transmission mechanism to transport the second driving power of the auxiliary motor mechanically to the clutch means.

7. A device according to claim 6, in which the device solely used for recording further comprises an opening for exposing the clutch means.

8. A device according to claim 7, in which the device solely used for recording further comprises a cover member to cover said opening.

9. A device according to claim 8, in which said cover member is a grip to hold the device solely used for recording.

10. A device according to claim 6, in which the transporting mechanism has a capstan roller to transport the magnetic tape at a constant speed, a supply reel to supply the magnetic tape and a take-up reel to take up the magnetic tape.

11. A device according to claim 10, in which the main motor drives the capstan roller and the take-up reel out of the capstan roller and said reels, while the auxiliary motor drives at least the supply reel and the take-up reel.

12. A device solely used for recording image pick-up video signals, comprising:
 image pick-up means to convert an object image into electrical signals;
 recording means to record on a long sized recording medium such video signals corresponding to said electrical signals;
 a supply and take-up mechanism for a recording medium including a supply reel stand to supply the long sized recording medium to the recording means and a take-up reel stand to take up the recording medium;
 a capstan to feed the recording medium at a constant speed;
 a motor to provide driving power for the capstan; and
 a supply and take-up driving mechanism to provide the driving power of the motor for the supply and take-up mechanism;
 wherein the supply and take-up driving mechanism gives the driving power of the motor only to the take-up reel stand of said supply and take-up reel stands.

13. A device according to claim 12, in which the long sized recording medium is a magnetic tape and the recording means is a magnetic head.

14. A camera having a recording system built therein, in which said recording system records image pick-up video signals on a magnetic tape housed in a tape cassette, comprising:
 an image pick-up lens;
 image pick-up means to convert an optical image obtained through said image pick-up lens into electrical signals;
 a drum which contains a magnetic head to record such video signals corresponding to the electrical signals and to which the tape comes in contact;
 a tape supply and take-up mechanism including a supply reel stand to supply the magnetic tape to the magnetic head and a take-up reel stand to take up the magnetic tape;
 a capstan to feed the magnetic tape at a constant speed; and
 a transporting driving mechanism to give the driving power simultaneously to the capstan and the supply and take-up mechanism;
 wherein the transporting driving mechanism gives the driving power of the motor of the motor only to the take-up reel stand of said supply and take-up reel stands.

15. A device according to claim 14, in which the image pick-up means is a solid image pick-up element.

* * * * *